US012310294B2

United States Patent
Stubbs

(10) Patent No.: US 12,310,294 B2
(45) Date of Patent: *May 27, 2025

(54) THORN EXTRACTOR APPARATUS

(71) Applicant: Burz, LLC, Colorado City, AZ (US)

(72) Inventor: Stacy Stubbs, Colorado City, AZ (US)

(73) Assignee: Burz, LLC, Colorado City, AZ (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/315,440

(22) Filed: May 10, 2023

(65) Prior Publication Data

US 2023/0320285 A1    Oct. 12, 2023

Related U.S. Application Data

(63) Continuation-in-part of application No. 16/944,374, filed on Jul. 31, 2020, now Pat. No. 11,678,611.

(60) Provisional application No. 63/387,658, filed on Dec. 15, 2022, provisional application No. 63/382,758, filed on Nov. 8, 2022, provisional application No. 63/340,041, filed on May 10, 2022, provisional application No. 62/882,262, filed on Aug. 2, 2019.

(51) Int. Cl.
*A01G 3/00*     (2006.01)
*A01G 17/02*    (2006.01)
*E01H 15/00*    (2006.01)
*A01G 5/00*     (2006.01)

(52) U.S. Cl.
CPC ...... *A01G 17/023* (2013.01); *A01G 2005/005* (2013.01)

(58) Field of Classification Search
CPC ............ A01G 17/023; A01G 2005/005; A01G 3/002; E01H 15/00
See application file for complete search history.

(56) References Cited

U.S. PATENT DOCUMENTS

| 4,482,019 A | 11/1984 | Murphy | |
|---|---|---|---|
| 8,449,683 B2* | 5/2013 | Vice | A01D 51/00 492/34 |
| 8,752,233 B2* | 6/2014 | Vice | E01H 15/00 15/230.11 |
| 2015/0105963 A1 | 4/2015 | Blackwell et al. | |

(Continued)

FOREIGN PATENT DOCUMENTS

CN    108967053 A    12/2018

*Primary Examiner* — Monica L Perry
(74) *Attorney, Agent, or Firm* — Gurr & Brande, PLLC; Robert A. Gurr

(57) ABSTRACT

A thorn extractor apparatus has a frame, a roller, a screen that surrounds the roller, and a collection bin for receiving the thorny seeds. The frame includes a first and second side member, frame couplers, and a plurality of horizontal beams. The roller and screen work together to pick up and convey the thorny seeds to the collection bin to be discarded. The thorn extractor apparatus may feature a plurality of rollers coupled to a plurality of screens. The thorn extractor apparatus may also feature a vacuum, a kickstand, added weights, and a hitch mechanism configured to be pulled by a vehicle. Two or more frames may be coupled together in sequence to multiply the number of rollers clearing the ground of thorny seeds. The thorn extractor apparatus, in some examples, may feature an automatic drive system or be couplable to a vehicle.

20 Claims, 19 Drawing Sheets

(56) References Cited

U.S. PATENT DOCUMENTS

2015/0208588 A1  7/2015  Cady
2021/0029885 A1  2/2021  Stubbs

* cited by examiner

THORN EXTRACTOR APPARATUS

CROSS-REFERENCE TO RELATED APPLICATIONS

This is a continuation-in-part of U.S. application Ser. No. 16/944,374, filed on Jul. 31, 2020, which claimed the benefit of U.S. Provisional Application Ser. No. 62/882,262, filed on Aug. 2, 2019, both of which are incorporated herein by reference. This application also claims the benefit of U.S. Provisional Application Ser. No. 63/387,658 filed on Dec. 15, 2022, U.S. Provisional Application Ser. No. 63/382,758 filed on Nov. 8, 2022, and U.S. Provisional Application Ser. No. 63/340,041 filed on May 10, 2022, each of which are incorporated herein by reference.

TECHNICAL FIELD

The present disclosure relates to a thorn removal apparatus. More particularly, the present disclosure relates to a roller apparatus for the removal and collection of thorns.

BACKGROUND

*Tribulus terrestris*, commonly referred to as goathead weeds or puncture vines, is a noxious weed that is aggressive and difficult to control. Goathead weeds are found in warm climates throughout the world. For example, goathead weeds may be found in Africa, North America, and Australia. Goathead weeds have long vines that produce many thorny seeds, which can lie dormant for years before a goathead weed emerges. The thorny seeds are known to cause pain to any person or animal that comes into contact with them. They are also notorious for puncturing bike tires and soles of shoes, causing frustration for many individuals.

These thorny seeds are often distributed to other locations by puncturing the skin of humans and animals. This distribution process is effective and often leads to many yards and fields becoming overwhelmed with the thorny seeds. Further, the thorny seeds are small and hard to pick up because of their sharp thorns. Due to the goathead weeds having a difficult and aggressive nature, many yards, fields, and native plant species are consumed each year. In fact, many individuals find that their efforts at removing the goathead weed from their land to be futile.

Many methods of removing goathead weeds are inefficient. Some of these methods include burning the weeds with propane, spraying to inhibit new growth, or using various approaches to collect the thorns. Specifically, when burning the goathead weeds, they must be burned while still alive and before they are dry. If not, the seeds may be dispersed leading to more goathead weed growth. Even burning the goathead weeds when they are alive may still not fully address the issue. The previously described methods take a lot of time, and even if persistent in the removal process, may not lead to any desired results.

When using any approach to remove the goathead weeds, there still remains the problem of the thorny seeds that have been dispersed on the ground. Spraying and burning may kill the weed, but may not kill all the seeds, which can then lead to future growth of the goathead weed. Typically, by the time goathead weed growth is readdressed after burning or spraying, there are more dried-out thorny seeds on the ground. To prevent future goathead weed growth, it is essential that seeds are not dispersed and that any dried out thorny seeds are collected and discarded. As previously discussed, the seeds are small, sharp, and difficult to pick up by hand. There have been several attempts to create devices that are capable of removing numerous seeds. However, these devices are expensive, not widely available for individual use, and have many other shortcomings.

Accordingly, there remains a need for an apparatus that removes and collects thorns in an easy, efficient, and cost-effective manner. The present disclosure seeks to solve these and other problems.

SUMMARY OF EXAMPLE EMBODIMENTS

In some embodiments, a thorn extractor apparatus comprises a frame, a roller, a screen that surrounds the roller, and a collection bin for receiving the thorny seeds. The frame may comprise a plurality of frame couplers, a plurality of side members, and a plurality of horizontal beams.

In some embodiments, a thorn extractor apparatus may further comprise an automatic drive system for driving the roller(s) and collection bin(s). In some embodiments, the thorn extractor apparatus may further comprise a vacuum assembly.

In some embodiments, a thorn extractor apparatus further comprises a hitch mechanism configured to be pulled by a vehicle. In some embodiments, the thorn extractor apparatus comprises a plurality of rollers and a plurality of screens that surround the plurality of rollers, thereby reducing the drag on the vehicle while increasing the efficiency of collecting the thorny seeds.

In some embodiments, a method of using a thorn extractor apparatus comprises a user holding a handle beam and pushing the thorn extractor apparatus to collect thorny seeds. In particular, as a user pushes the thorn extractor apparatus, a roller and a screen rotate. The roller makes contact with the thorny seeds, where they become stuck in the roller. The user then continues to push the thorn extractor apparatus. When the roller turns with the thorny seeds attached, the screen detaches the thorny seeds as the screen lifts off and moves away from the roller towards the collection bin. The thorny seeds are then deposited into the collection bin as the screen continues to move around the roller. The roller continues to pick up thorny seeds and the process continues until the collection bin is filled. With the collection bin being filled, the user can detach the collection bin and discard the thorny seeds.

In some methods, a user may couple an automatic drive system to a thorn extractor apparatus for automatic use and collection of thorns.

In some methods, a user may couple a thorn extractor apparatus to a vehicle for pulling through a field.

DETAILED DESCRIPTION OF EXAMPLE EMBODIMENTS

Figure 1:
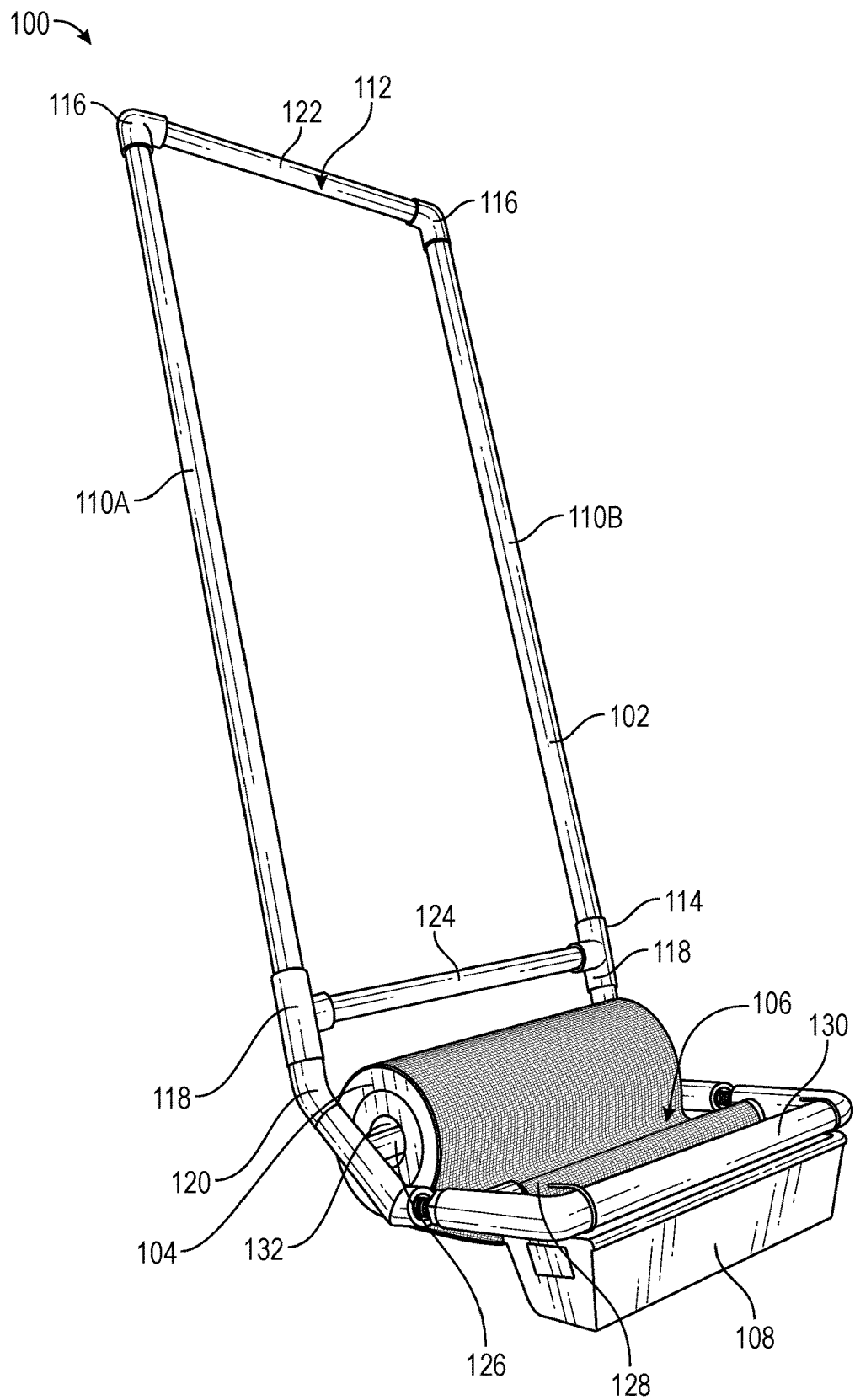
FIG. 1 illustrates a front, side perspective view of a thorn extractor apparatus.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in some embodiments," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

The terms "thorny seeds," "goathead seeds," and the like as used herein are meant to include all thorns, thistles, nettles, barbs, briars, seeds, and otherwise unwanted, sharp or pointed objects found on the ground.

As previously discussed, there remains a need for an apparatus that removes and collects thorny seeds in an easy, efficient, and inexpensive manner. The present disclosure seeks to solve these and other problems.

Thorny seeds, especially goathead seeds, are a prevalent ecological threat that often consumes a pristine tract of land. Thorny seeds not only damage yards and fields but can also cause physical pain to humans and animals. There have been many attempts at removing thorny seeds, with many of these attempts having shortcomings. For example, individuals often burn goathead weeds. However, burning weeds does not always destroy the thorny seeds. In fact, many seeds may survive the heat produced by the fire, and because these thorny seeds are not removed from the land, additional goathead weeds may grow.

A thorn extractor apparatus described herein assists a user in removing the thorny seeds from their land. Generally, the thorn extractor apparatus may comprise a frame with a roller that contacts the ground to pick up and remove thorny seeds that are spread across a tract of land. The thorny seeds are lifted from the roller and deposited into a collection bin via a screen. It will be appreciated that the thorn extractor apparatus allows a user to permanently remove thorny seeds from any tract of land, thereby preventing future weed growth.

Figure 2:
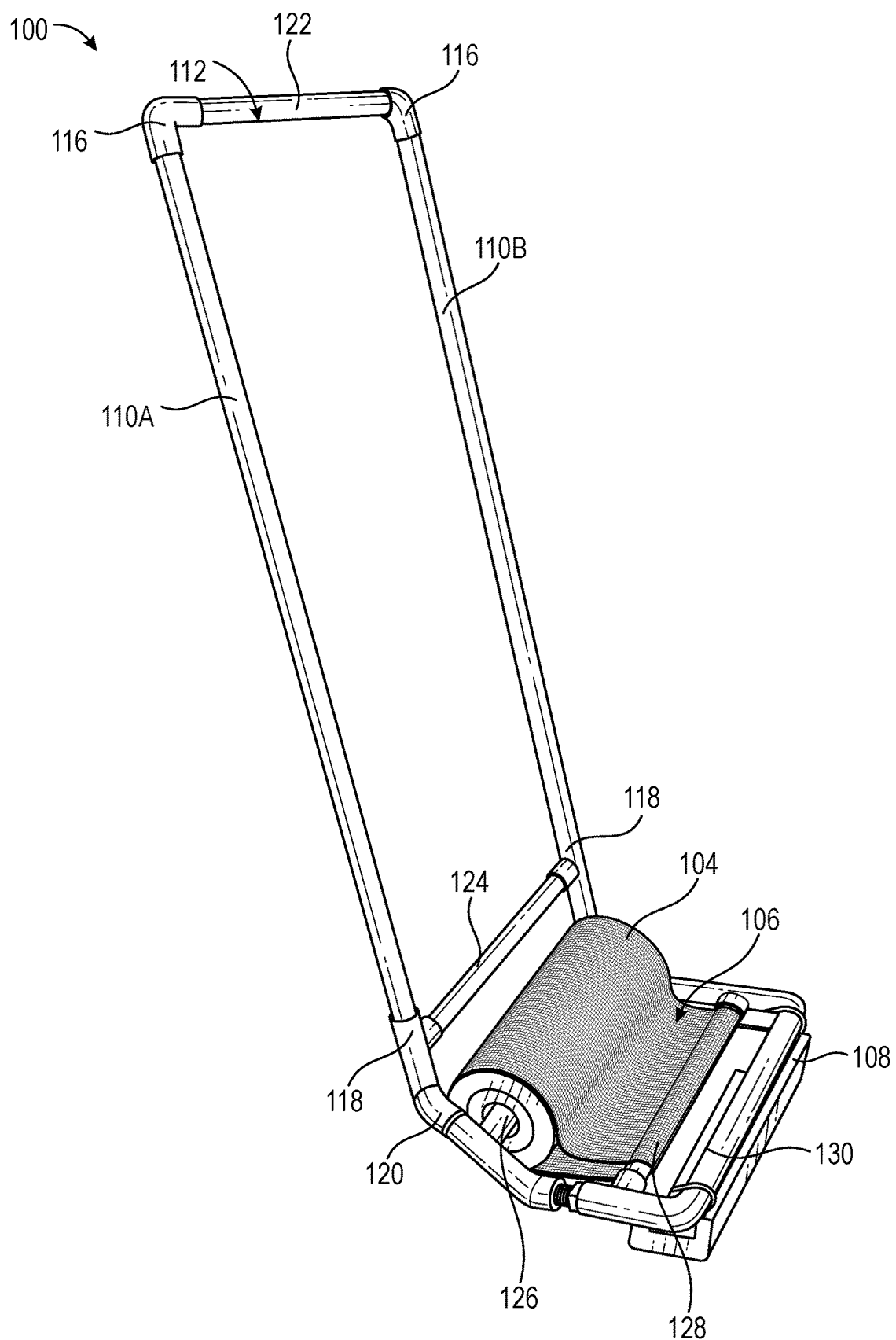
FIG. 2 illustrates a top, side perspective view of a thorn extractor apparatus.
Figure 3:
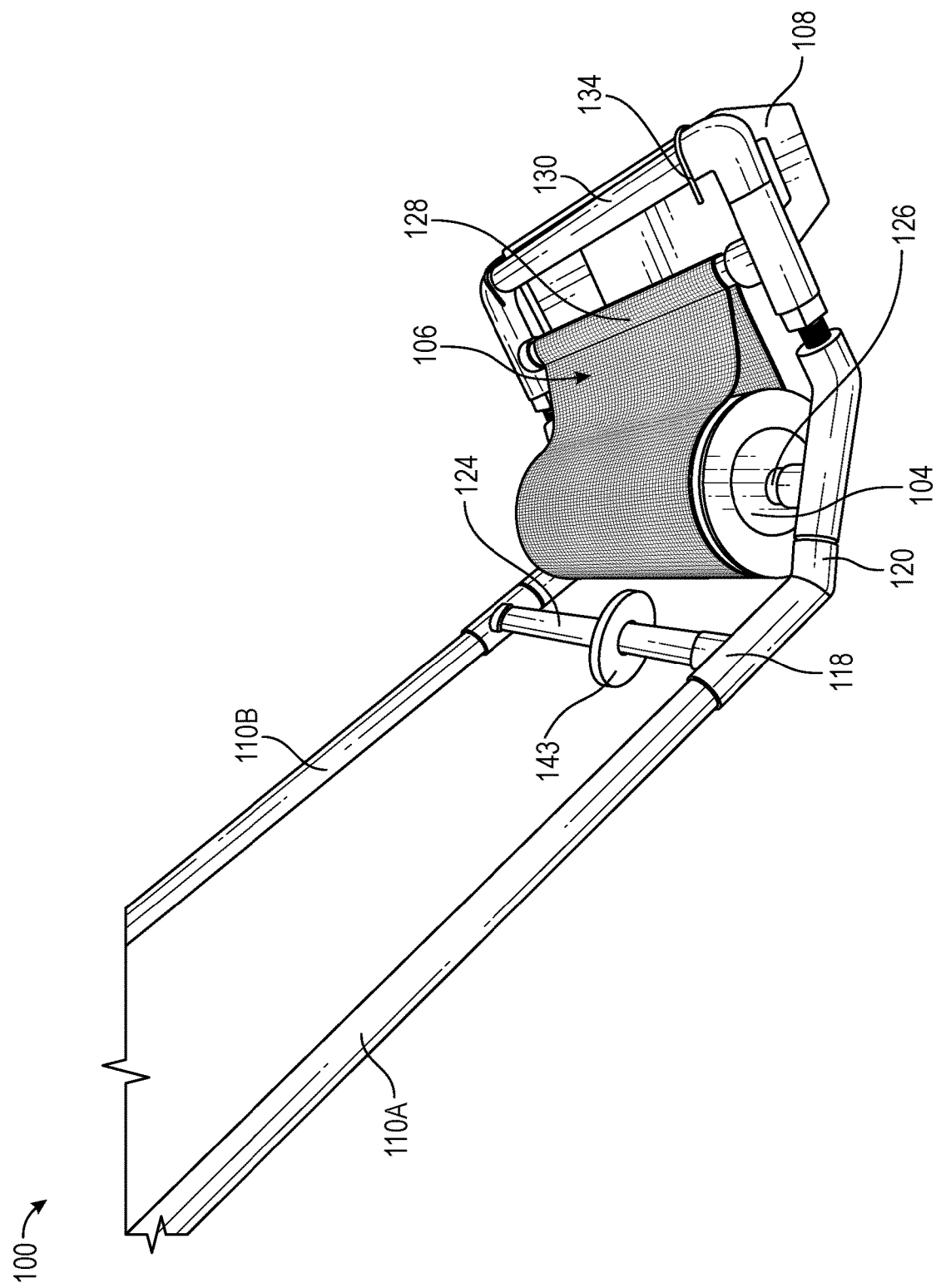
FIG. 3 illustrates a detailed, side perspective view of a thorn extractor apparatus with a weight coupled to the frame.

In some embodiments, as shown in FIGS. 1-3, the thorn extractor apparatus 100 comprises a frame 102, a roller 104, a screen 106 that surrounds the roller 104, and a collection bin 108 couplable to the frame 102, configured to receive the thorny seeds. The frame 102 may be polyvinyl chloride (PVC). However, it could be envisioned that other materials may be used, such as steel, aluminum, wood, plastics, etc. The frame 102 may comprise a first and a second side member 110A, 110B; however, it may be understood that the frame 102 could comprise one or a plurality of side members. The frame 102 also comprises a plurality of horizontal beams 112 that couple the side members 110A, 110B together, adding structure and strength to the thorn extractor apparatus 100. The frame 102 further comprises frame couplers 114 that may couple the side members 110A, 110B and the plurality of horizontal beams 112 together. The frame couplers 114 may comprise corner couplers 116, beam couplers 118, and angled couplers 120 to couple the first and second side members 110A, 110B and the plurality of horizontal beams 112 into a single unit.

The plurality of horizontal beams 112 may comprise a handle beam 122, a structure beam 124, a roller beam 126, a screen beam 128, and a collection bin beam 130. The handle beam 122 is positioned at a top portion of the thorn extractor apparatus 100, while the structure beam 124, the roller beam 126, the screen beam 128, and the collection bin beam 130 are positioned at a bottom portion of the thorn extractor apparatus 100. The roller beam 126 is inserted through a roller aperture 132 on the roller 104.

Figure 5:
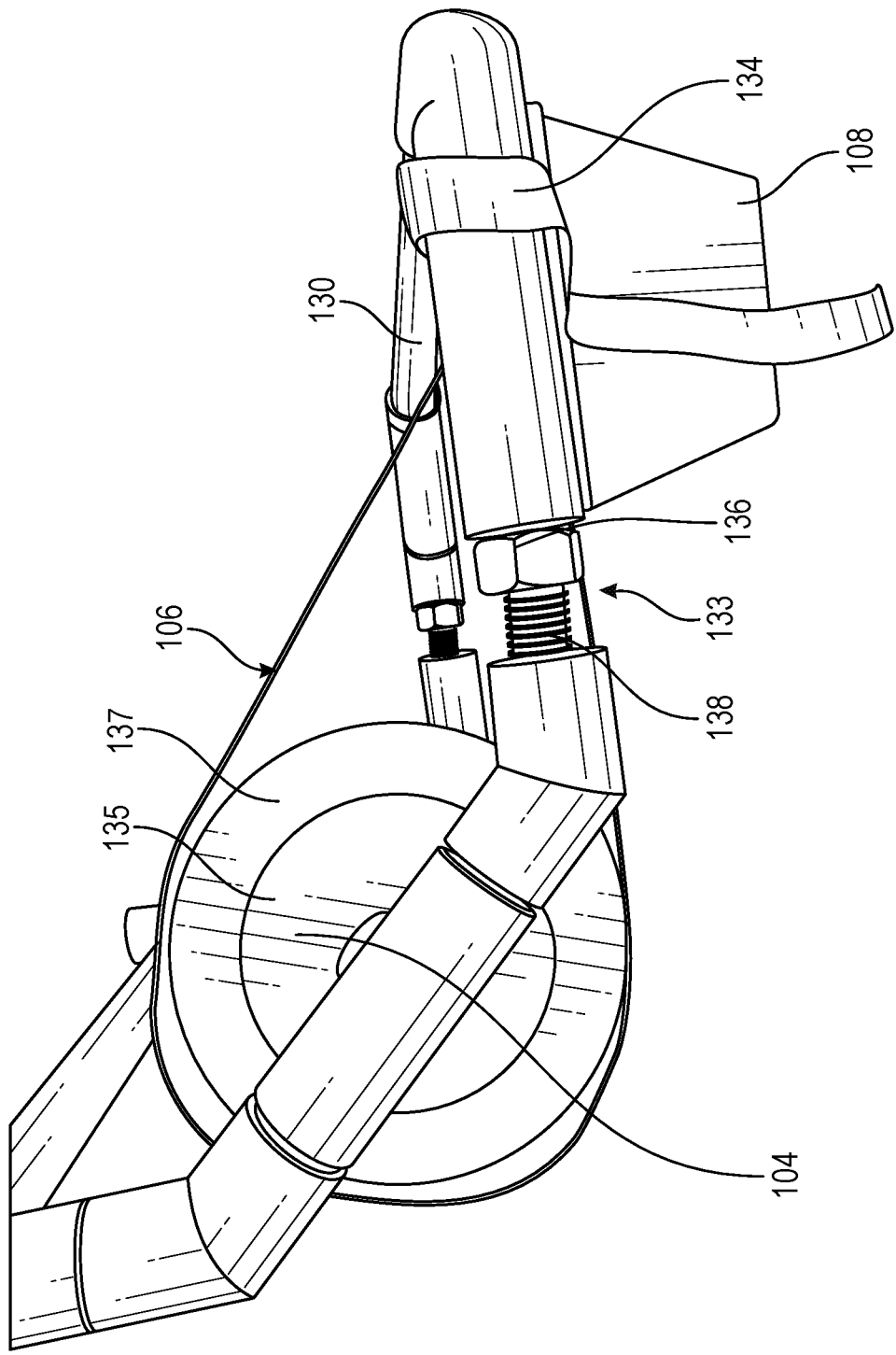
FIG. 5 illustrates a detailed, side perspective view of a roller, a screen, and a tensioner of a thorn extractor apparatus.

Referring to FIG. 5, the roller 104 may be made of an inner material 135 that is hard, such as plastic, and a soft outer material 137, such as neoprene, that is removably couplable to the inner material. However, other rollers may be used comprising rubber, vinyl, soft plastic, foam, natural and synthetic polymers, or any other materials and combinations thereof that can be easily punctured by a thorny seed. While the soft outer material 137 may be durable indefinitely or otherwise intended to endure for the life of the thorn extractor apparatus 100, it is contemplated that the soft outer material 137 may alternatively be removed periodically and replaced with a new soft outer material having a renewed affinity for adhering to thorny seeds. The roller 104 may be of varying sizes ranging between a small diameter and a large diameter. It will be appreciated that the roller 104 accumulates the thorny seeds from the ground through engagement with the soft outer material 137 on the roller 104, thereafter depositing the thorny seeds into the collection bin 108 via the screen 106.

In some embodiments, the roller 104 may be a hard, hollow drum fillable with a liquid or a solid to increase a weight of the roller 104, leading to more pressure applied to the ground surface and a higher propensity to retrieve the dispersed thorny seeds. Likewise, additional weight may also be added to the thorn extractor apparatus 100 by filling inner channels and compartments of the frame 102 with water. The frame 102 may comprise an inlet valve and an outlet valve. Both the inlet valve and the outlet valve may be threaded in a manner configured to be couplable to a hose. The additional water may be added, for example, through attaching a garden hose to the inlet valve on the frame 102 and then subsequently placing a cap on the inlet valve to contain the water. After use, the water may then be removed through an outlet valve at a base of the frame 102 closer to the ground, allowing gravity to siphon out the water.

In some embodiments, as shown in FIG. 3, the thorn extractor apparatus 100 may further comprise one or more weights 143 couplable to the frame 102, configured to increase the pressure applied by the roller 104 across the ground and thereby improve the collection of thorny seeds. The one or more weights 143 may be cylindrical plates or any shape with a center aperture for coupling to the structure beam 124 or other horizontal beam 112. To add or remove the one or more weights 143, for example, the beam coupler 118 may first be removed and the center aperture of the one or more weights 143 slid over the structure beam 124. In some embodiments, the one or more weights 143 may alternatively be secured to any part of the frame 102 by a fastening mechanism such as a clamp or a hook and loop.

Figure 4:
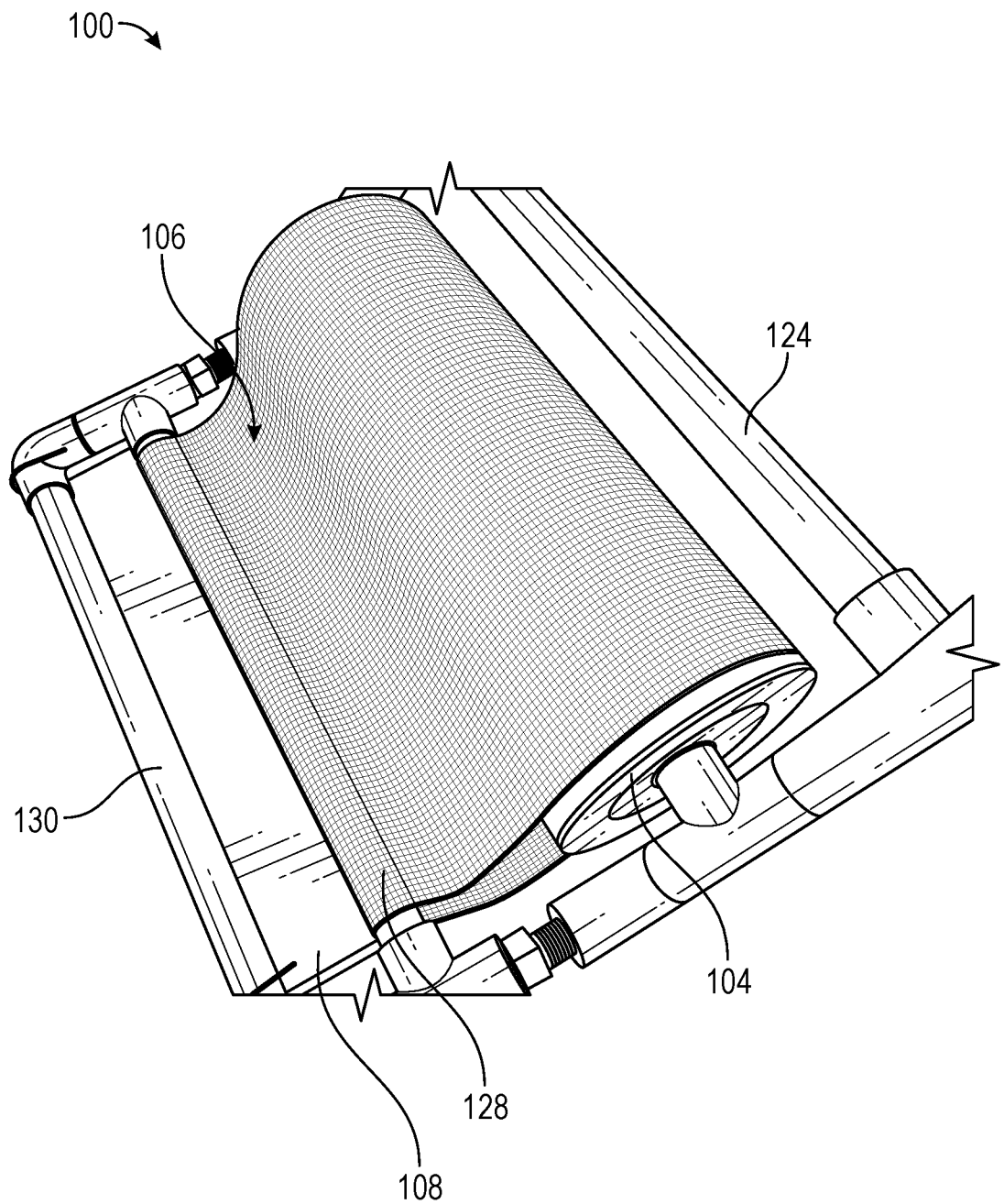
FIG. 4 illustrates a top perspective view of a roller, a screen, and a collection bin of a thorn extractor apparatus.

Referring to FIG. 4, the screen 106 may be a window screen. Alternatively, the screen 106 may be mesh or any thin material that can be punctured so as to allow thorny seeds to penetrate the roller 104. The screen 106 may be positioned to encompass the screen beam 128 and the roller 104. The screen 106 rotates with the roller 104, removing the thorny seeds, in a conveyor belt-like fashion, from the roller 104. In operation, the thorn extractor apparatus 100 picks up thorny seeds when the seeds become either enmeshed in the screen 106 or otherwise puncture the roller 104 and become stuck. As the screen 106 moves around the roller 104, the screen 106 lifts the thorny seeds off of the roller 104 and are ultimately deposited in the collection bin. It will be appreciated that the thorn extractor apparatus 100, with the screen 104, removes all of the thorny seeds that attach to the roller 106. The screen 104 is able to lift all thorny seeds that have penetrated the roller 104 and deposit them into the collection bin 108.

Figure 6:
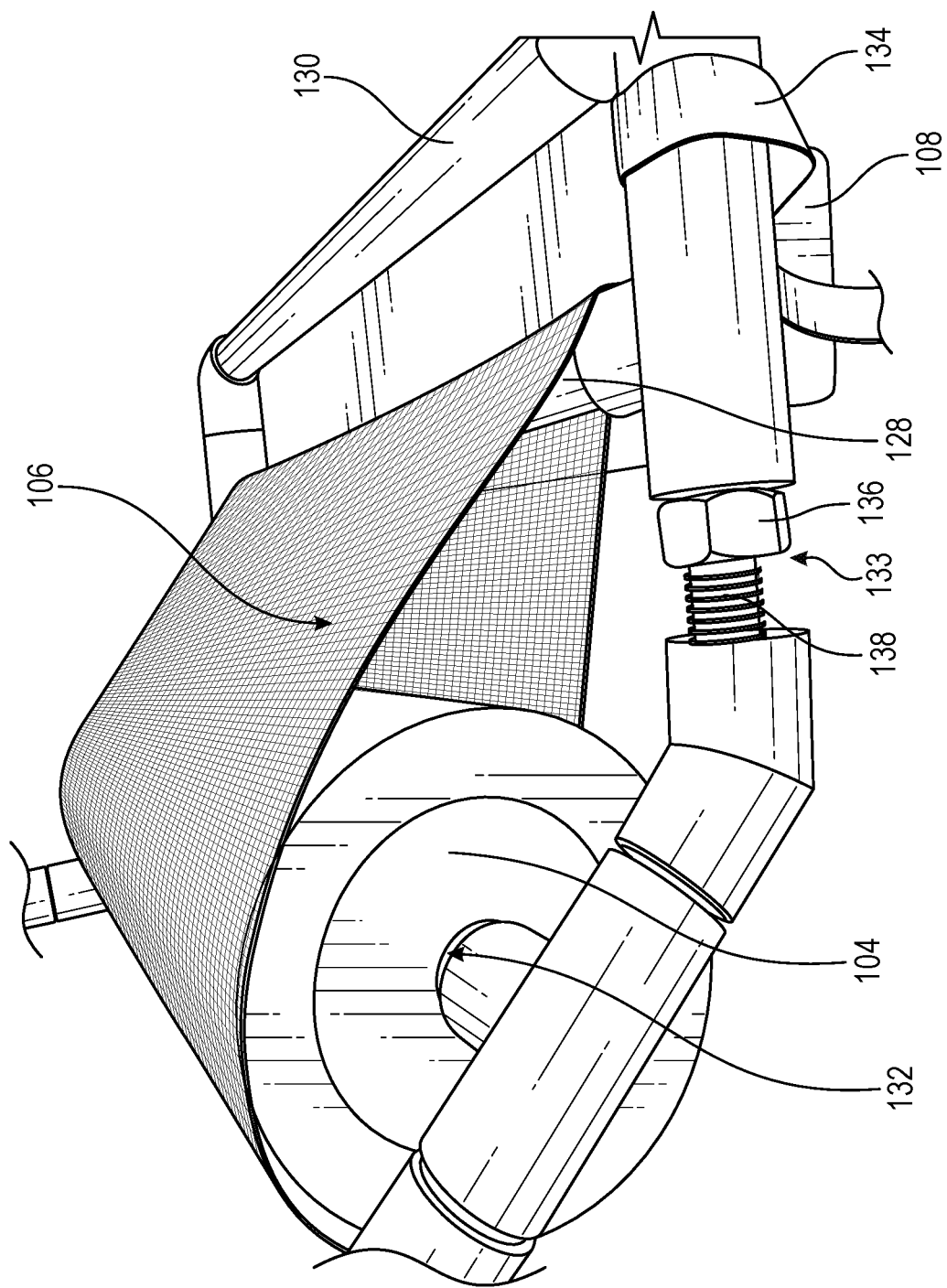
FIG. 6 illustrates a detailed, side perspective view of a roller, a screen, a tensioner, and a collection bin of a thorn extractor apparatus.

As shown in FIGS. 5-6, a tensioner 133 may increase the tension or tightness of the screen 106. The tensioner 133 may function by utilizing a nut 136 and bolt 138. In other words, as the nut 136 is moved along the bolt 138, the screen beam 128 and the collection bin beam 103 move relative to the movement of the nut 136 and the bolt 138. If the nut 136 allows more of the bolt 138 to be exposed (i.e., extended), then more tension is placed on the screen 106. On the other hand, if less of the bolt 138 is exposed, then less tension is placed on the screen 106. While the tensioner 133 shown utilizes a nut 136 and bolt 138, it will be appreciated that other tensioners may be used, such as push-button poles having apertures and spring-loaded pins, twist and lock mechanisms, linear actuators, or any other extending/retractable mechanism.

The collection bin 108 may be rectangular and plastic. Alternatively, it may be a bag or any other bin for collection and storage. The collection bin 108 may be of the same length as the roller 104 so as to collect all the thorny seeds picked up by the roller 104. The collection bin 108 comprises a securement mechanism such as one or more hooks 134 that hook on collection bin beam 130; however, it will be appreciated that the securement mechanism may comprise, for example, straps and hook and loop fasteners (shown in FIGS. 5-6), snaps, tongues and grooves, or other mechanisms so as to be couplable to the collection bin beam 130. It will be appreciated that other securement mechanisms may be used, such as wire hooks (shown in FIG. 3), bolts and nuts, hinges, locking pins, etc. It will further be appreciated that the securement mechanism 134 can quickly be attached and released, which makes discarding the thorny seeds simple. Further, the collection bin 108 is positioned beneath the screen beam 128 to be able to receive the thorny seeds from the screen 106.

Figure 7:
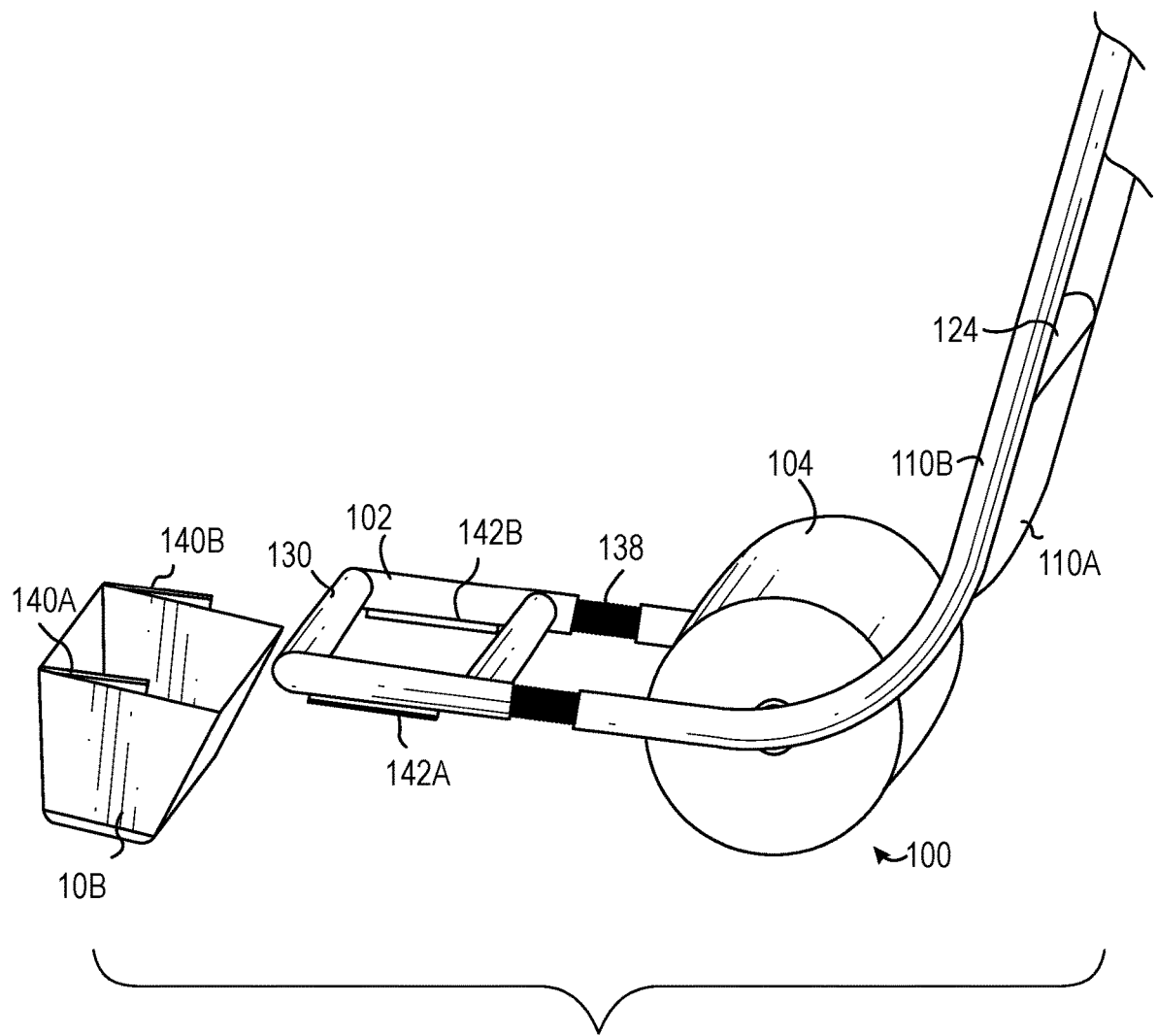
FIG. 7 illustrates a side, top perspective view of a thorn extractor apparatus with a collection bin decoupled therefrom.
Figure 8:
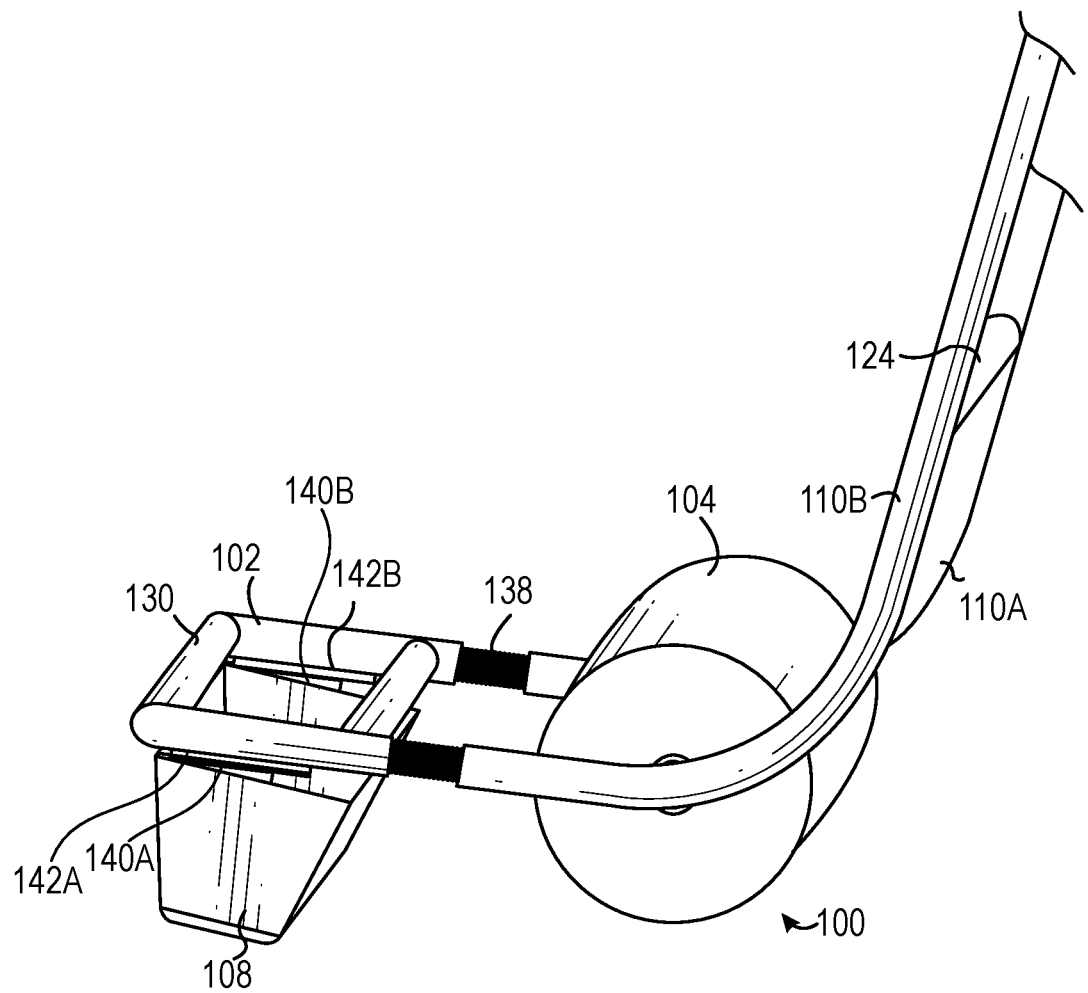
FIG. 8 illustrates a top, side perspective view of a thorn extractor apparatus.

In some embodiments, as shown in FIGS. 7-8, the securement mechanism of the collection bin 108 comprises a first rail 140A on a first side, opposite a second rail 140B on a second side. In turn, the frame 102 may comprise a first channel 142A on a first side, opposite a second channel 142B on a second side, wherein the first and second rails 140A-B are couplable respectively to the first and second channels 142A-B, such as by sliding them together.

The first and second rails 140A-B may comprise a base that projects upwards from a top of a mouth of the collection bin 108 and an extension member that curves outwards perpendicularly to the base that slides along the first and second rails 140A-B and locks into place. In some embodiments, the first and second channels 142A-B may be U-channels, Hat channels, H-bars, or other alternative fastening mechanisms configured to enable the first and second rails 140A-B to be inserted and removed therefrom.

The thorn extractor apparatus 100 may comprise a first configuration wherein the collection bin 108 is removed from the frame 102. The first configuration enables a user to dispose of any and all accumulated thorny seeds from the collection bin 108 and other materials collected during operation of the thorn extractor apparatus 100. Subsequently, as shown in FIG. 8, the thorn extractor apparatus 100 may comprise a second configuration wherein the collection bin 108 is coupled to the frame 102 along the first and second channels 142A-B. The second configuration enables a user to accumulate thorny seeds and other materials deposited within the collection bin 108 during use of the thorn extractor apparatus 100. Throughout use of the thorn extractor apparatus over a large field or area, a user may repeatedly remove or insert the first and second rails 140A-B from the first and second channels 142A-B, thereby easily discarding thorns collected therein. While the screen 106 is not shown in several figures (for ease of viewing other components), it will be understood that the screen 106 surrounds each roller and scream beam in each embodiment.

Figure 9:
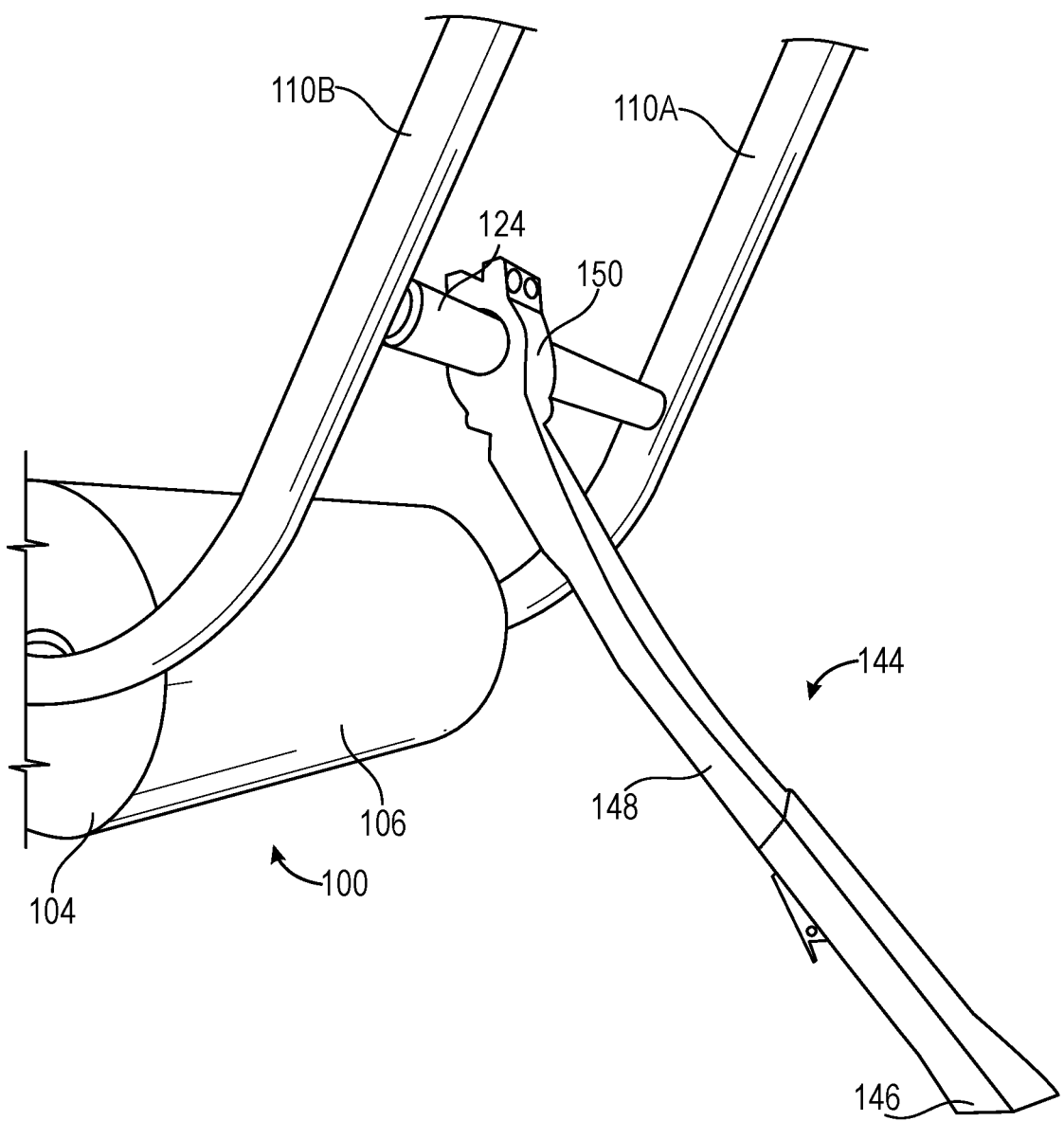
FIG. 9 illustrates a top, side perspective view of a thorn extractor apparatus comprising a kickstand.

In some embodiments, as shown in FIG. 9, the thorn extractor apparatus 100 may further comprise a kickstand 144 couplable to the frame 102 or, more particularly, one of the plurality of horizontal beams 112, such as the structure beam 124. The kickstand 144 may comprise a textured base 146 at a distal end of an elongated member 148, and a clamp 150 or other fastener configured to rotatably secure the kickstand 144 to the frame 102. The textured base 146 may be a rubber cap or plastic stopper at an end of the elongated member 148. The kickstand 144 may further comprise a spring or detent mechanism that is stretched when the kickstand 144 is partway deployed and less stretched when the kickstand 144 is stowed or all the way deployed, allowing the kickstand 144 to lock in place. It will be appreciated that positioning the kickstand 144 towards a rear center of the frame 102, as shown in FIG. 9, enables the thorn extractor apparatus 100 to stand on its own when stationary without tipping over and provides added stability when stored on uneven ground. As discussed earlier, it will be appreciated that the kickstand 144 may hold the thorn extractor apparatus 100 steady during filling and/or removal of water from the frame 102 and during removal of the bin 108 for emptying the thorny seeds.

In some embodiments, a method of using a thorn extractor apparatus 100 comprises a user holding the handle beam 122 and pushing the thorn extractor apparatus 100. As a user pushes the thorn extractor apparatus 100, a roller 104 and a screen 106 turns, making contact with, and securing, thorny seeds to the roller 104. The user then continues to push the thorn extractor apparatus 100. When the roller 104 turns with the thorny seeds, the screen 106 detaches the thorny seeds as it lifts off and moves away from the roller 104 towards the collection bin 108. The thorny seeds are then dropped into the collection bin 108 as the screen 106 continues to rotate about the roller 104 and screen beam 128. In turn, the roller 104 continues to pick up thorny seeds and the process continues until the collection bin 108 is filled. The user can then detach the collection bin 108 and discard the thorny seeds.

Figure 10:
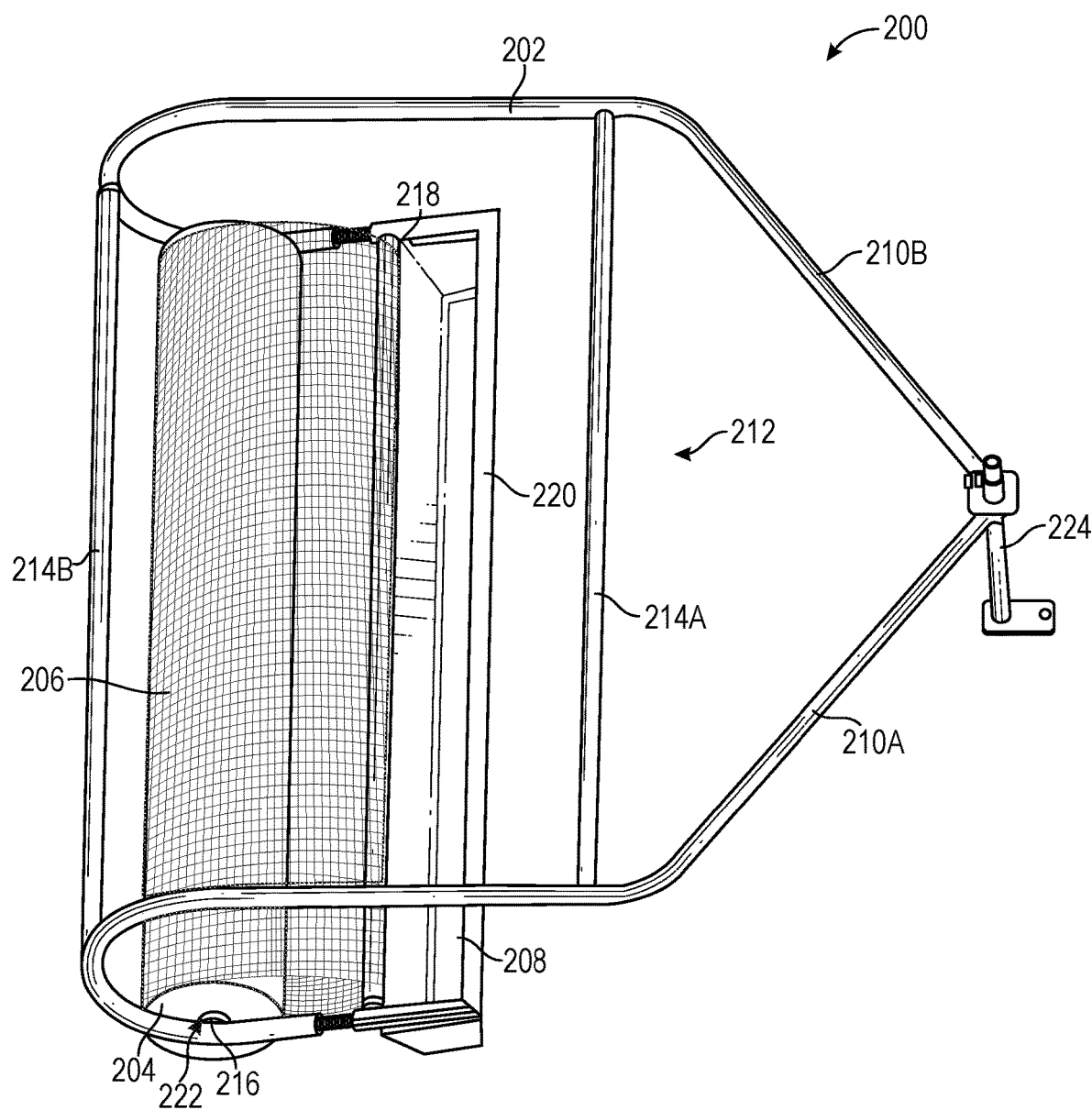
FIG. 10 illustrates a top perspective view of a thorn extractor apparatus configured for towing by an automatic drive system or a vehicle.
Figure 11:
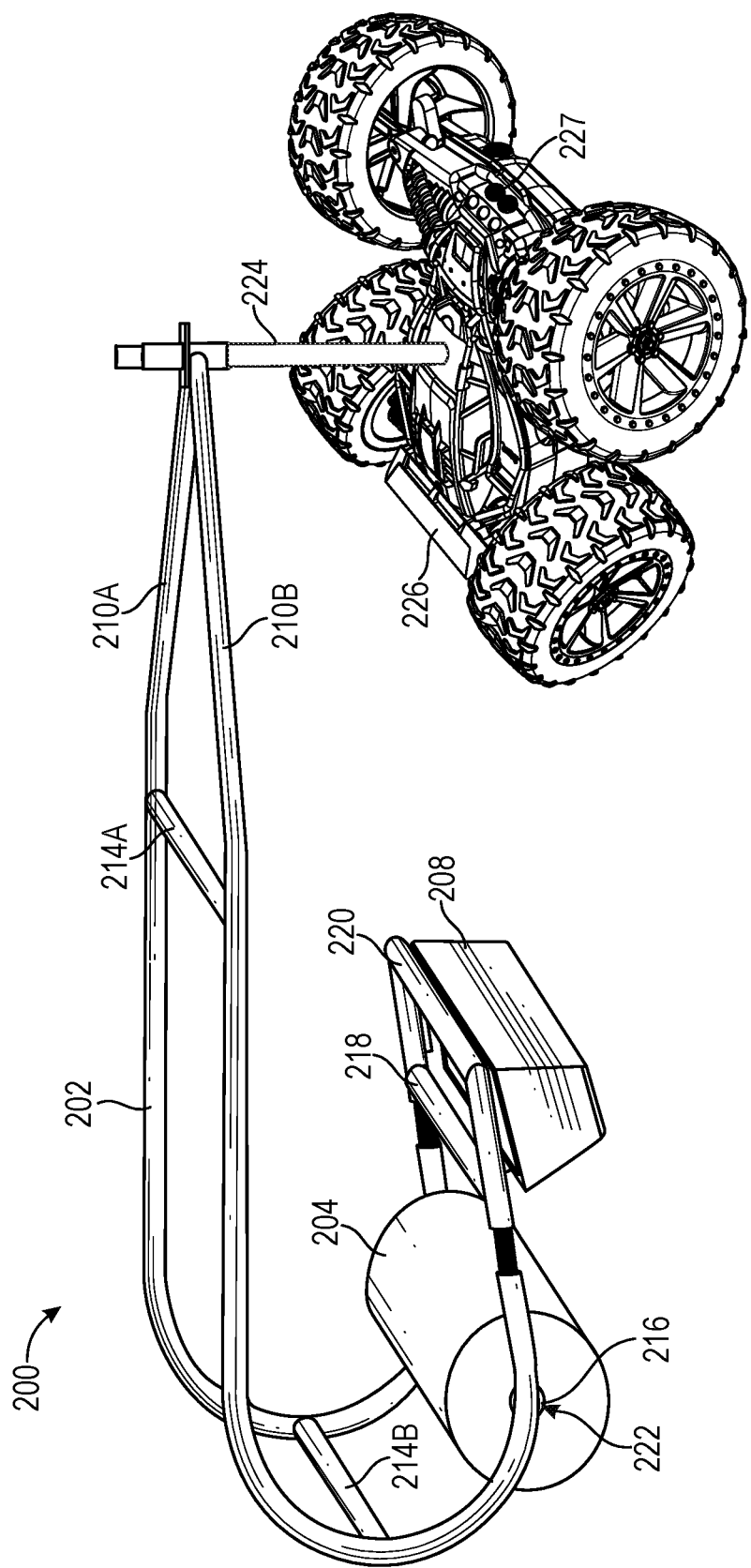
FIG. 11 illustrates a side perspective view of a thorn extractor apparatus being towed by an automatic drive system.

As shown in FIGS. 10-11, a thorn extractor apparatus 200 may comprise a frame 202, a roller 204, a screen 206 that surrounds the roller 204, and a collection bin 208 for receiving the thorny seeds. The frame 202 may comprise first and second side members 210A, 210B; however, it may be understood that the frame 202 could alternatively comprise either one or a plurality of side members. The frame 202 may also comprise a plurality of horizontal beams 212 that couple the first and second side members 210A, 210B together, adding structure and strength to the thorn extractor apparatus 200.

The frame 202 may further comprise frame couplers that may couple the first and second side members 210A, 210B and the plurality of horizontal beams 212 together through corner couplers, beam couplers, and angled couplers. Alternatively, the horizontal beams 212 may be coupled to the first and second side members 210A, 210B through welding, riveting, compression fitting, threaded bolts, or any other mechanical fasteners. The plurality of horizontal beams 212 may comprise one or more structure beams 214A, 214B, a roller beam 216, a screen beam 218, and a collection bin beam 220. The first and second side members 210A, 210B may curve downwardly so as to form a lower or bottom portion. The roller beam 216, the screen beam 218, and the collection bin beam 220 are positioned at a bottom portion of the thorn extractor apparatus 200. The roller beam 216 is inserted through a roller aperture 222 on the roller 204.

The first side member 210A may begin parallel to the second side member 210B for a first length and then converge together at a hitch mechanism 224. The hitch mechanism 224 may comprise apertures couplable to a vertical or horizontal member, a ball and trailer hitch assembly, a gooseneck hitch, a hook and ring assembly, or any other hitch or fastening mechanism known in the art configured to permit the frame 202 to both pivot about, and trail behind, a vehicle or automatic drive system 226, as seen in FIG. 11.

The automatic drive system 226 may comprise an electronic control module having a microprocessor and a semiconductor operative using DRAM, SRAM, or other memory processes, wherein the electronic control module is autonomously in control of one or more of the following systems: a powertrain control module, a transmission control module, a brake control module, a central control module, a central timing module, a general electronic module, and/or a suspension control module. The automatic drive system 226 may further comprise offroad wheels or tracks configured to maneuver over uneven terrain, a global positioning system (GPS) module, and one or more front and rear sensors 227 configured to enable autonomous driving. The one or more front and rear sensors 227 may comprise infrared photocells, radar, LiDAR, ultrasonic sensors, camera-based optical vision, or other alternative means to autonomously navigate around the ground that are in communication with the electronic control module.

In some embodiments, the automatic drive system 226 may be operative using an internal combustion engine or an electric powertrain and battery. In the embodiments having an electric powertrain and battery, the automatic drive system 226 may also comprise a dock or charging station couplable to an electrical outlet and configured to recharge the battery during off use. Examples of similar automatic drive systems include iRobot® vacuums and robotic lawn mowers, such as the Automower®. The thorn extractor apparatus 200 may operate either via a remote-control receiving user input or through autonomous control within a predetermined boundary area. The predetermined boundary area may be set using a software interface, such as on a paired smartphone, or by physical indicators readable by the sensors 227.

In some embodiments, the automatic drive system 226 further comprises a wireless transceiver, allowing the automatic drive system 226 to communicate with a smartphone application or other user software using known protocols, such as Wi-Fi, Bluetooth®, etc. A user may program the automatic drive system 226 using the smartphone application and may also see device history, usage, effectiveness (weight of bin, camera aimed at bin, etc.), errors, battery status, and other features. It will be appreciated that this autonomous control enables the thorn extractor apparatus 200 to make multiple passes around the user's yard or ground each day and season-round to consistently reduce the incidence of thorny seeds present.

Figure 12:
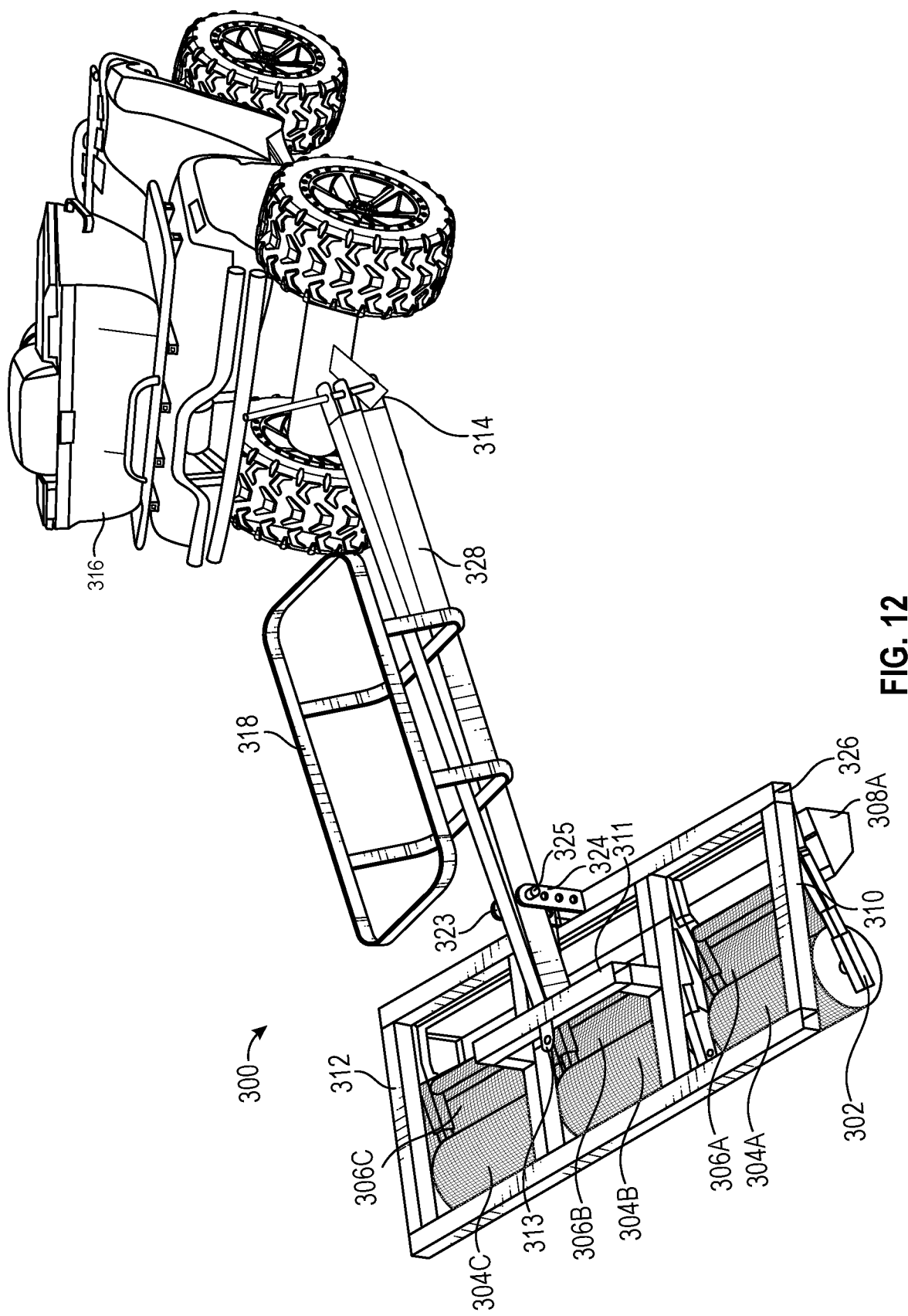
FIG. 12 illustrates a top, side perspective view of a thorn extractor apparatus being towed by a vehicle.

The automatic drive system 226 may be fully-autonomous or remotely-controlled (either by specific physical remote or through a remote control interface on software usable on a phone or tablet). In some embodiments, a vehicle may be used to tow the thorn extractor apparatus 200. For example, an all-terrain vehicle (ATV), a tractor, a truck, a car, a riding lawnmower, or other vehicle with the capacity to tow the frame 202 may be used (as shown in FIG. 12).

In some embodiments, a method of using the thorn extractor apparatus 200 comprises a user coupling the hitch mechanism 224 to an automatic drive system 226, operating the automatic drive system 226 either remotely or autonomously to pull the frame 202 of the thorn extractor apparatus 200 thereby engaging the roller 204 and causing the screen 206 to rotate about the roller 204. The method further comprises the roller 204 engaging the thorny seeds along the ground and rotating them, via the screen 206, towards the collection bin 208, the screen 206 lifting the thorny seeds off the roller 204 and depositing them into the collection bin 208. The process may continue until the collection bin 208 is filled; whereafter, the user may detach the collection bin 208 and discard the thorny seeds. In some embodiments, the hitch mechanism 224 may be coupled to a vehicle for towing.

Referring to FIGS. 12-17, in some embodiments, a thorn extractor apparatus 300 comprises a lower frame 302, a plurality of rollers 304A, 304B, 304C, a plurality of screens 306A, 306B, 306C (FIGS. 12-14) that surrounds the plurality of rollers 304A, 304B, 304C, and a plurality of collection bins 308A, 308B, 308C for receiving the thorny seeds. The plurality of screens 306A, 306B, 306C may be coupled correspondingly to a plurality of screen beams 330A, 330B, 330C. It will be understood, however, that the lower frame 302 could alternatively comprise any number of rollers, screens, and collection bins either respectively or in combinations thereof. The plurality of screens 306A, 306B, 306C are not shown in FIGS. 15-17 for clarity in viewing other components.

The larger the embodiment of the thorn extractor apparatus 300, for example, including self-propelled applications for clearing a large acreage of land, the greater the quantity of the plurality of rollers 304A, 304B, 304C, the plurality of screens 306A, 306B, 306C, and the plurality of collection bins 308A, 308B, 308C, may be incorporated within the lower frame 302 in order to provide more contoured surface area to match the topography of the ground profile, thereby picking up more thorny seeds.

Figure 15:
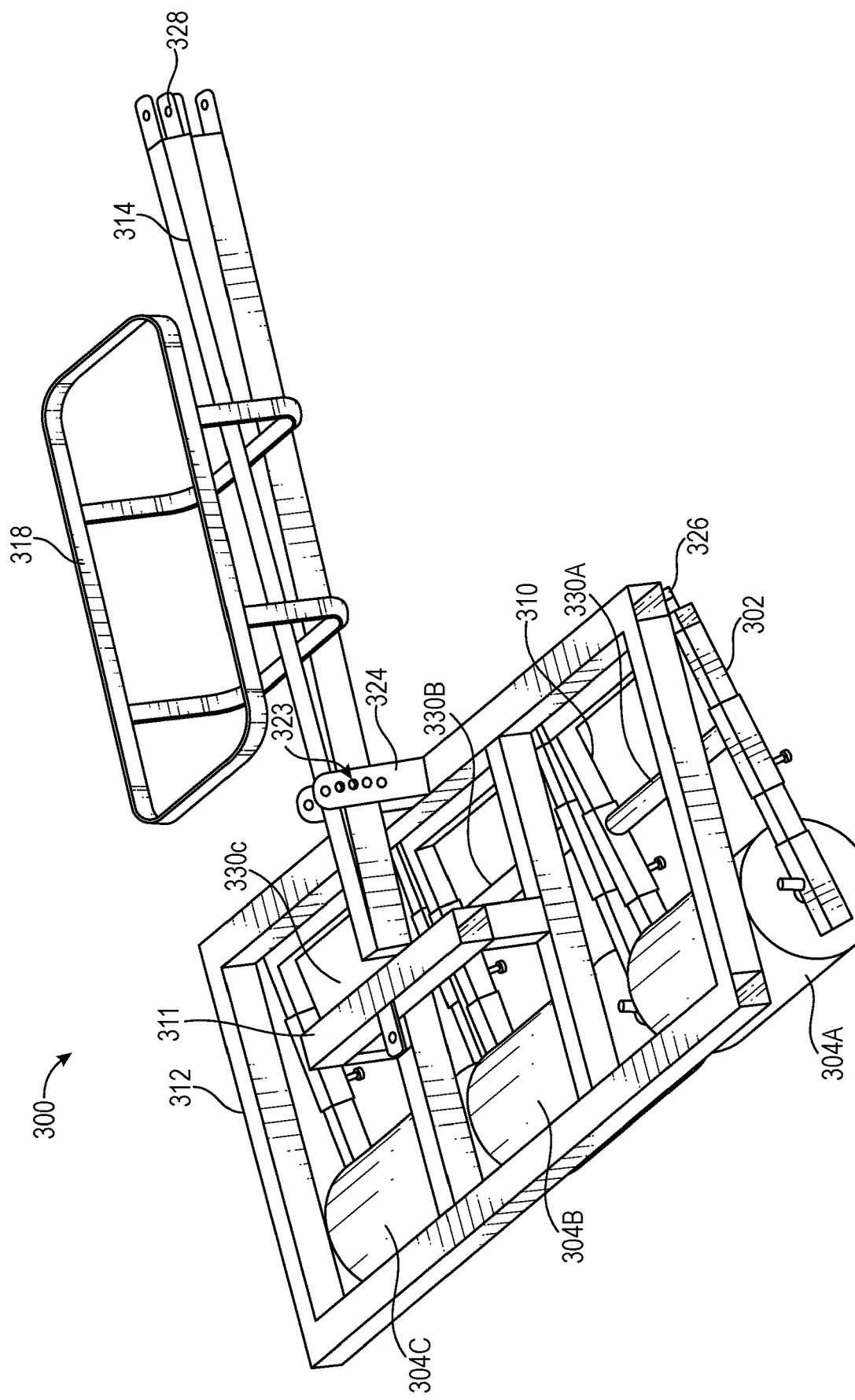
FIG. 15 illustrates a rear perspective view of a thorn extractor apparatus.
Figure 16:
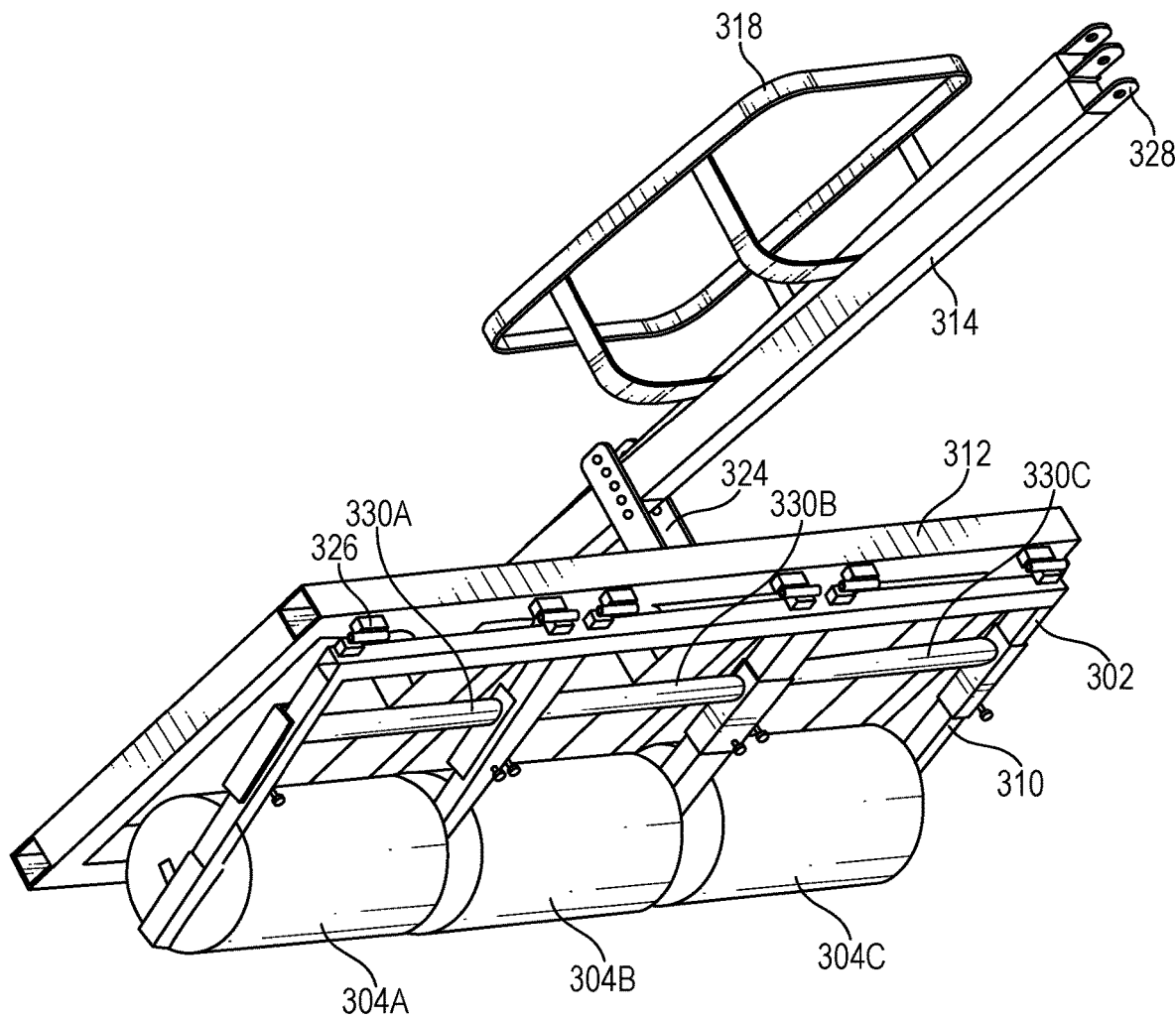
FIG. 16 illustrates a bottom perspective view of a thorn extractor apparatus.

The lower frame 302 may comprise a plurality of side members 310, wherein a respective side member 310 is positioned on each side of each of the plurality of rollers 304A, 304B, and 304C, respectively. The plurality of side members 310 may be telescoping or otherwise extendable and retractable to adjust the leverage and drag across the plurality of screens 306A, 306B, 306C. The plurality of side members 310 may be couplable to an upper frame 312 via a plurality of hinges 326, as best seen in FIGS. 15-16. The plurality of hinges 326 may be configured to permit the lower frame 302 to pivot in relation to the upper frame 312, again, allowing for contour changes in terrain, among other uses.

The upper frame 312 may be coupled to a tongue 314 for coupling to a vehicle.

Figure 13:
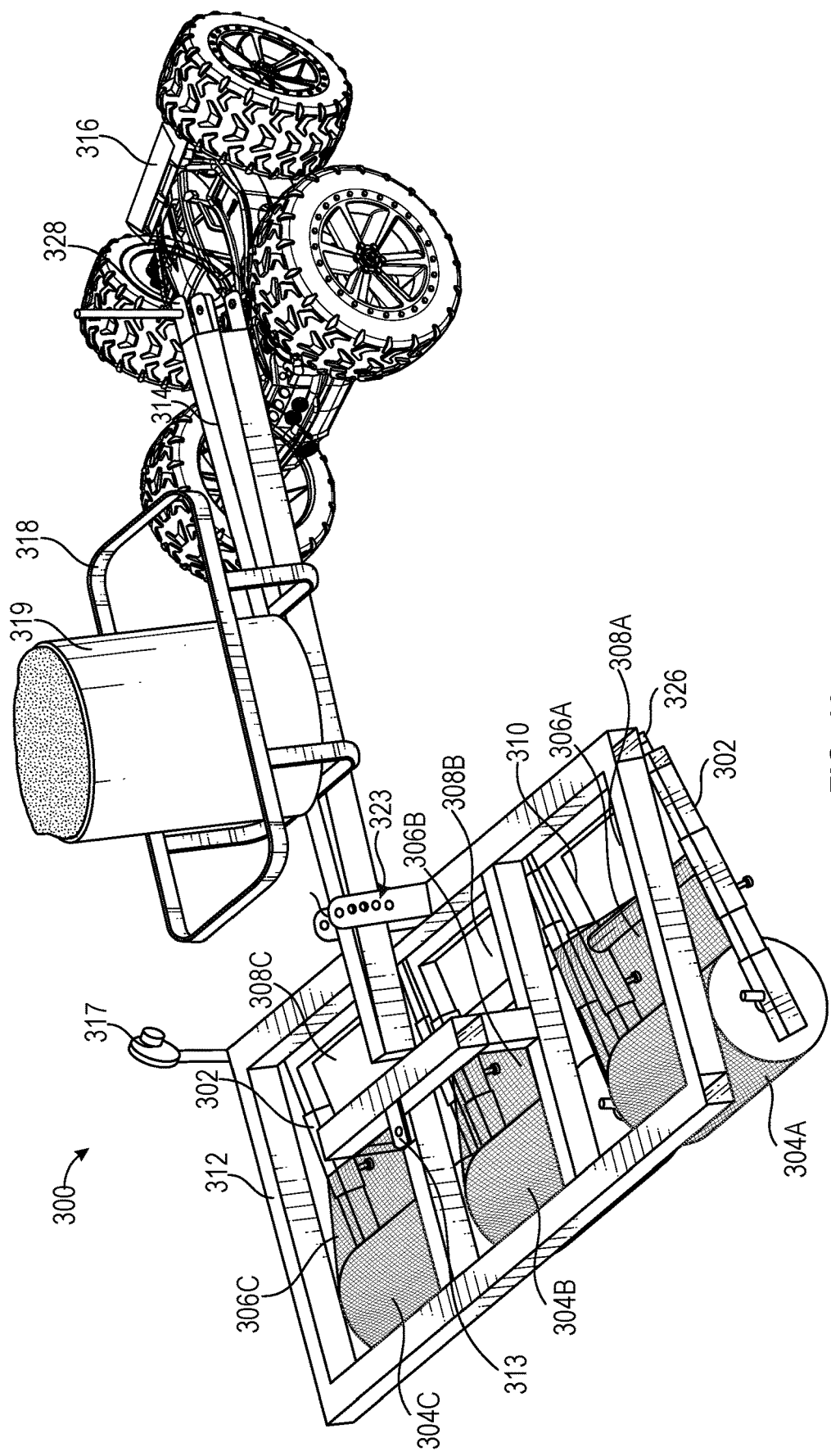
FIG. 13 illustrates a perspective view of a thorn extractor apparatus being towed by an automatic drive system.
Figure 14:
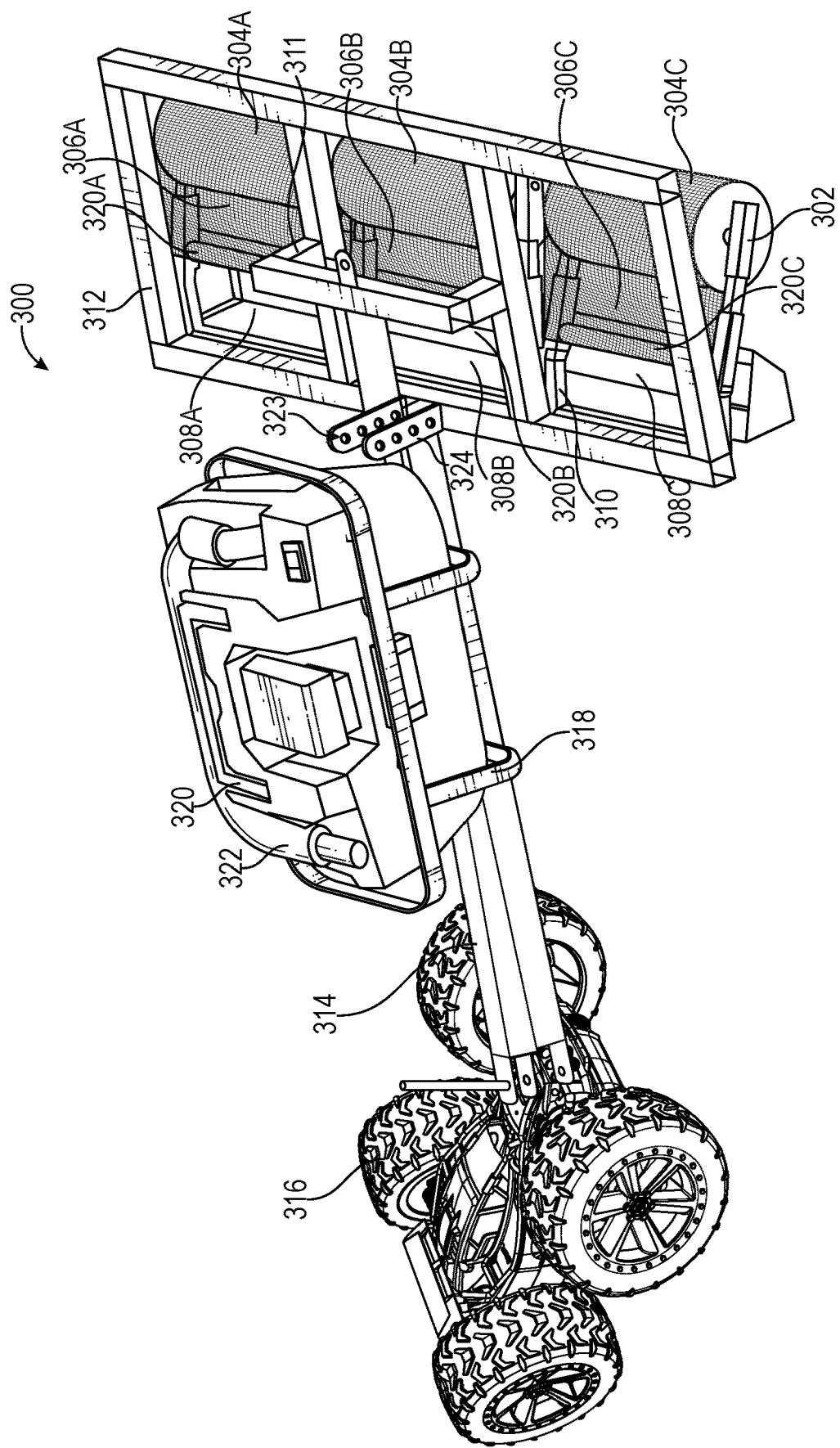
FIG. 14 illustrates a perspective view of a thorn extractor apparatus comprising a vacuum and coupled to an automatic drive system.

Additionally, the upper frame 312 may comprise a plurality of apertures 323 (FIG. 13) along a vertical adjustment member 324. Movement of the tongue 314 on the upper frame 312 along the plurality of apertures 323 enables the thorn extractor apparatus 300 to be fitted at the appropriate angle and height to be coupled to a tow vehicle 316 of varying sizes, as shown in FIG. 13. The tow vehicle 316 may be an automatic drive system, a riding lawnmower, an all-terrain vehicle (ATV), tractor, truck, car, or any other suitable towing device.

Figure 17:
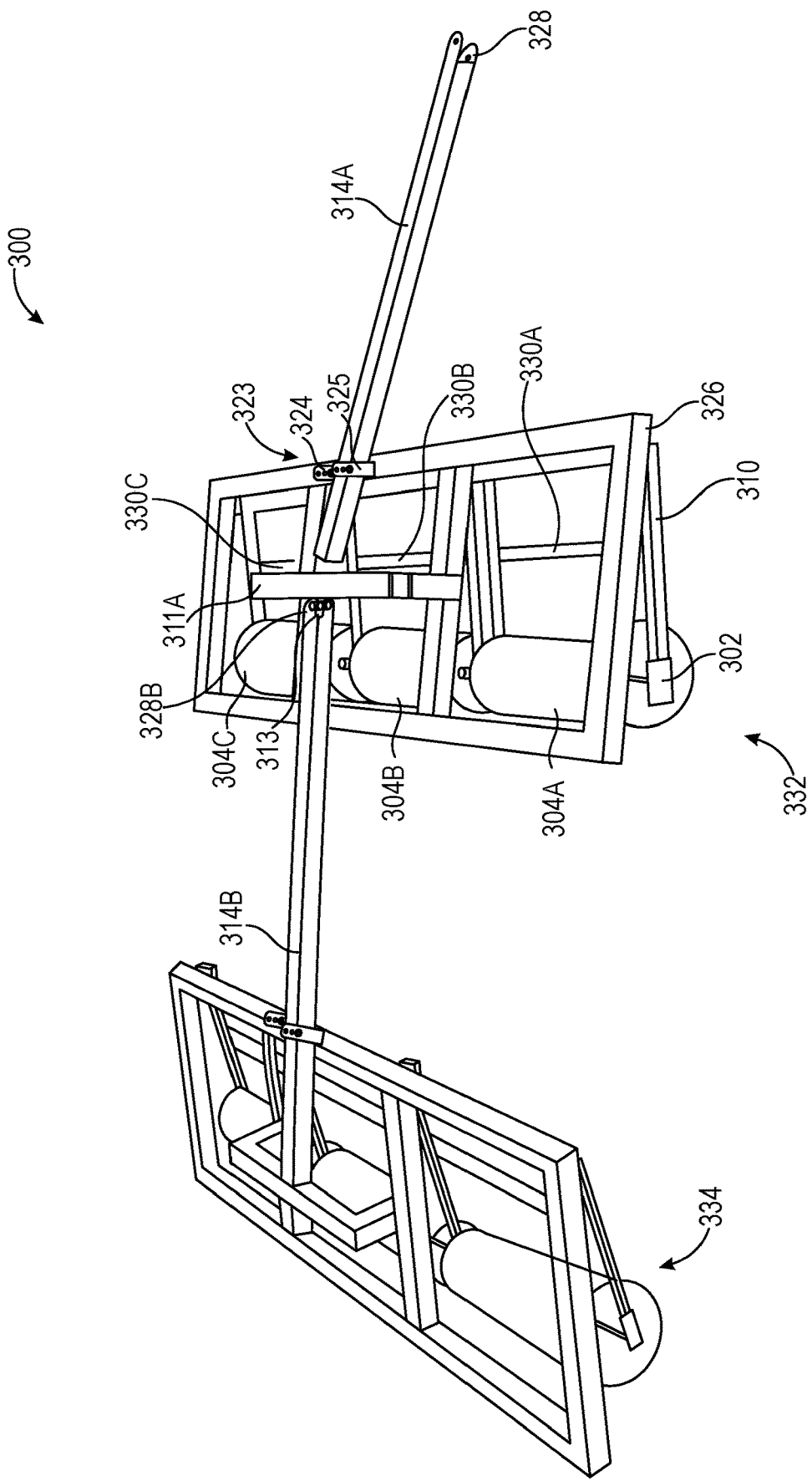
FIG. 17 illustrates a top perspective view of a first thorn extractor apparatus coupled to a second thorn extractor apparatus.

The upper frame 312 may also comprise an accessory frame 311 comprising a tab 313 having an aperture, flap, loop, clasp, or other fastening mechanism that projects rearwardly (in an opposite direction of the tongue 314) and is configured to permit the thorn extractor apparatus 300 to tow additional equipment or attachments, or to couple additional thorn extractor apparatuses 300 thereto (such as by coupling the hitch mechanism of one thorn extractor apparatus 300 to the tab 313, as shown in FIG. 17).

The tongue 314 may further comprise a basket 318 or other housing structure configured to fasten an overflow container such as a bucket 319 (FIG. 13) or a vacuum 320 (FIG. 14) to the tongue 314. The overflow container may receive the thorny seeds accumulated in the collection bins 308A, 308B, 308C once full without having to empty the thorny seeds into a trash receptacle during use. For example, the vacuum 320 may be used manually to siphon thorny seeds and thistles from the plurality of collection bins 308A, 308B, 308C for storage and disposal away from the land that has been recently cleared. In some embodiments, the vacuum 320 may comprise a hose 322 couplable directly to the plurality of collection bins 308A, 308B, 308C whereby the thorny seeds are immediately transferred to a depository within the vacuum for contained storage. In other embodiments, as shown, the hose 322 may be stored on the vacuum until used by a user.

Referring back to FIG. 13, the tongue 314 may further comprise a hitch 328 or alternative fastening mechanism, as previously outlined above, whereby the tongue 314 is couplable to the tow vehicle 316 which may comprise a self-propelled vehicle or other vehicle, as previously discussed. In some embodiments comprising an automatic drive system, an antenna 317 may be used for wireless communication with a user device for operating and maneuvering the automatic drive system. The antenna 317 may be in wireless communication with a remote control for manual driving as well, if desirable. However, it will be appreciated that antenna 317 is not required.

Additionally, in some embodiments, the thorn extractor apparatus 300 may comprise at least one controller, at least one motor, and at least one sensor, for automatically maneuvering the thorn extractor apparatus 300.

In some embodiments, a method of using a thorn extractor apparatus 300 comprises a user coupling the hitch 328 to the tow vehicle 316. The user may also adjust the angle of the tongue 314 by adjusting its positioning along the plurality of apertures 323 on the vertical adjustment member 324. The user then drives or operates the tow vehicle 316 pulling the upper frame 312 and lower frame 302, thereby engaging the plurality of rollers 304A, 304B, 304C and causing the plurality of screens 306A, 304B, 304C to rotate about the plurality of rollers 304A, 304B, 304C. The plurality of rollers 304A, 304B, 304C then make contact with thorny seeds along the ground, where the screen 306A, 306B, 306C then lifts the thorny seeds upwards and towards the plurality of collection bins 308A, 308B, 308C, dropping the thorny seeds into the plurality of collection bins 308A, 308B, 308C. The process continues until the plurality of collection bins 308A, 308B, 308C are filled. In some embodiments, the method further comprises emptying the bins 308A, 308B, 308C in a container (e.g., bucket 319) or siphoning the thorny seeds from the plurality of collection bins 308A, 308B, 308C using a vacuum 320 for storage and disposal.

In some embodiments, as shown in FIG. 17, the extractor apparatuses 300 may comprise a first thorn extractor apparatus 332 coupled to a second thorn extractor apparatus 334. The hitch 328B on the tongue 314B of the second thorn extractor apparatus 334 may be coupled to the tab 313 of the accessory frame 311A of the first thorn extractor apparatus 332. The above coupling process, as described, may thereafter be repeated as desired by a user. As contemplated, but without limitation, six thorn extractor apparatuses 300, for example, may be couplable together in sequence and pulled behind the tow vehicle 316. It will be appreciated that said embodiments allow for sequential apparatuses 300 to pick up any thorns missed by the prior apparatus 300.

In some embodiments, the thorn extractor apparatus 100, 200, 300 may further comprise a disposable bag couplable within the collection bin 108, 208, 308. The disposable bag may be spread out over the corners of the collection bin 108, 208, 308 or otherwise be couplable to the collection bin beam 118, 220 or other frame members. In some embodiments, the disposable bag may replace the collection bin 108, 208, 308. After using the thorn extractor apparatus 100, 200, 300, a user may fasten the disposable bag shut using a built-in draw string or other fastener, dispose of the disposable bag, and then replace it with a new disposable bag. The disposable bag may comprise a puncture-resistant material including plastics and other polymers, such as a low-density polyethylene, that will resist tearing when exposed to the thorny seeds.

Figure 18:
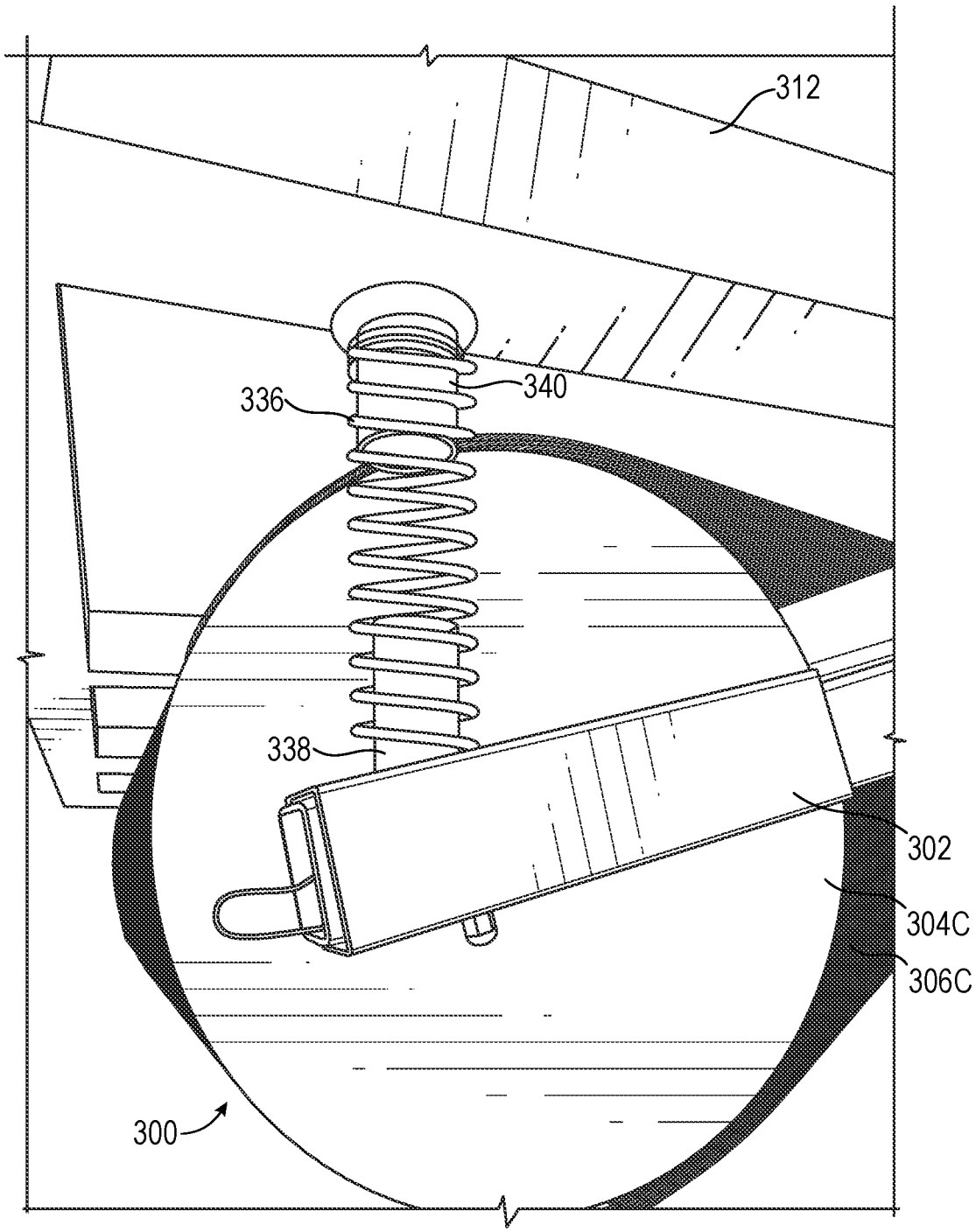
FIG. 18 illustrates a detailed, side perspective view of a spring coupled between a lower frame and an upper frame of a thorn extractor apparatus.

Referring to FIG. 18, in some embodiments, the thorn extractor apparatus 300 further comprises a spring 336 coupled between the lower frame 302 and the upper frame 312. As depicted, the lower frame 302 may comprise a first post 338 about which a first end of the spring 336 is coupled while the upper frame 312 comprises a second post 340 about which a second end of the spring 336 is coupled. The spring 336 may be a helical compression spring or alternative form of spring that compensates for uneven ground surfaces. The spring enables a surface area of the plurality of rollers 304A, 304B, 304C to more closely conform to and approximate the profile of the ground. This is additionally beneficial when a plurality of rollers 304A-C are utilized, as it allows each roller to move independently to compensate for the terrain. It will be appreciated that the increased responsiveness of the plurality of rollers 304A-C enables the thorn extractor apparatus 300 to pick up and collect more thorny seeds distributed across the ground regardless of whether the ground is flat or uneven. While the spring 336 is shown in use with the thorn extractor apparatus 300, the spring 336 may also be used with the other embodiments of the thorn extractor apparatus 100, 200 discussed herein. Additionally, while a spring 336 is shown, other mechanisms may be used, such as shock absorbers (e.g., hydraulic cylinders, coilovers, etc.), dampers, or similar mechanisms known in the art of vehicle suspension systems.

Figure 19:
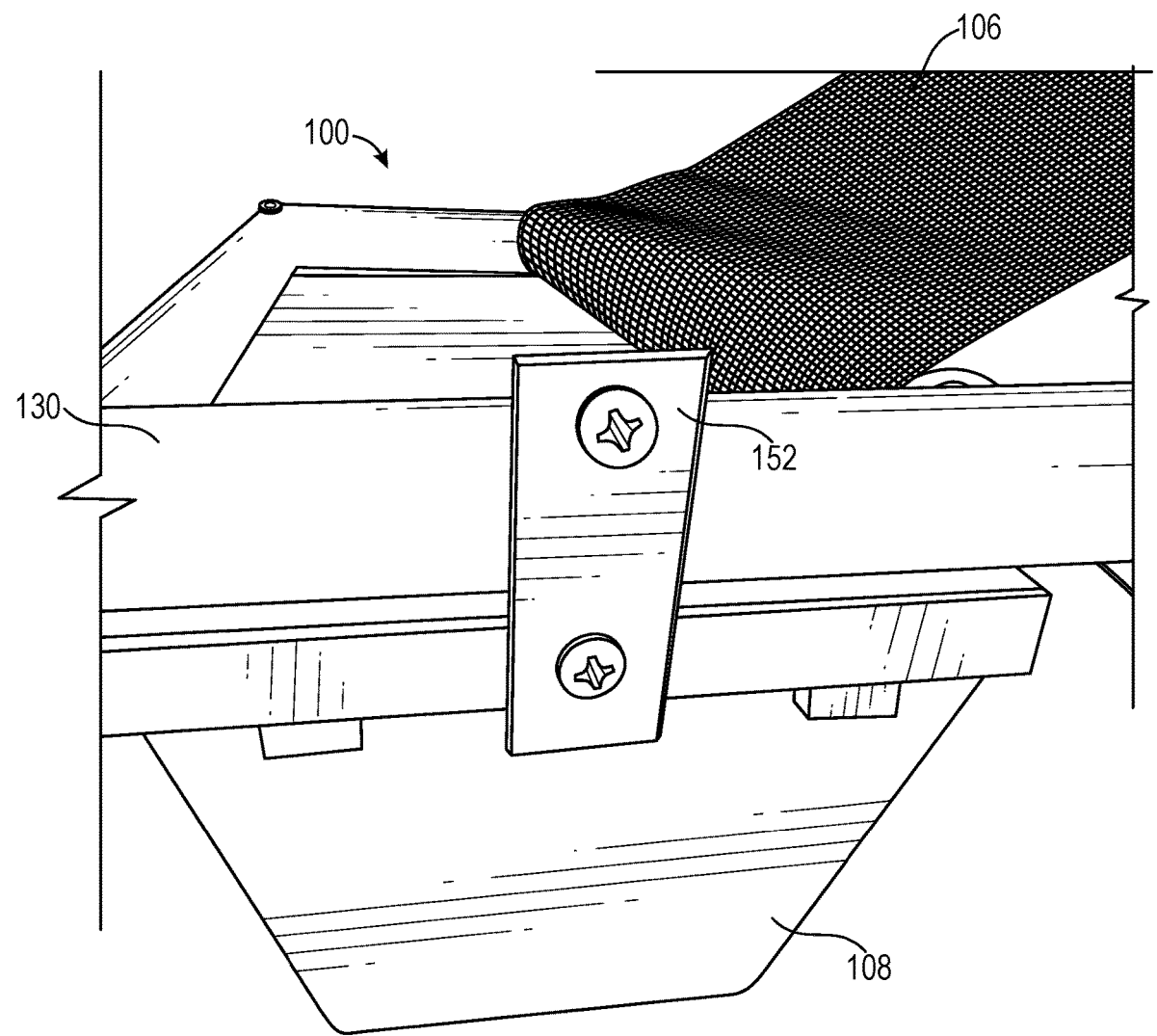
FIG. 19 illustrates a detailed, side perspective view of a strap coupled between a collection bin and a collection bin beam of a thorn extractor apparatus.

Referring to FIG. 19, in some embodiments, the thorn extractor apparatus 100 may comprise a strap 152 coupled between the collection bin 108 and the collection bin beam 130 or alternatively between the collection bin 108 and any member of the frame 102. The strap 152 may comprise leather, nylon, related polymers, or alternative materials. The strap 152 may be secured to the collection bin 108 and the collection bin beam 130 via a screw, snap, hook and loop, buckle, or alternative fastening mechanism. It will be appreciated that the strap 152 may securely hold the collection bin 108 to the collection bin beam 130 during use of the thorn extractor apparatus 100 and also easily decoupled when needed to remove the collection bin 108 from the frame 102 to discard the thorny seeds that were collected. The strap 152 may be used separately from, or in conjunction with, the first and second rails 140A-B and corresponding first and second channels 142A-B, as described earlier in FIGS. 7-8.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:
1. A thorn extractor apparatus, comprising:
a frame comprising a roller beam and a screen beam;
a roller coupled to the roller beam and configured to rotate about a longitudinal axis of the roller beam and retrieve thorny seeds from an area of ground through impaling the thorny seeds into the roller;
a screen surrounding both the roller and the screen beam, wherein the screen is configured to remove the thorny seeds from the roller and deposit them into a collection bin; and an automatic drive system for maneuvering the thorn extractor apparatus.

2. The thorn extractor apparatus of claim 1, wherein the automatic drive system is remote-controlled.

3. The thorn extractor apparatus of claim 2, wherein the automatic drive system is programmable for autonomous use.

4. The thorn extractor apparatus of claim 1, further comprising a tensioner configured to adjust tension on the screen.

5. The thorn extractor apparatus of claim 1, wherein the roller comprises a hard, hollow drum couplable to a soft outer material.

6. The thorn extractor apparatus of claim 5, wherein the soft outer material comprises neoprene, foam, soft plastic, rubber, vinyl, or a synthetic polymer.

7. A thorn extractor apparatus, comprising:
- a frame comprising:
  - a roller beam,
  - a screen beam,
  - a first side member, and
  - a second side member opposite the first side member, wherein the first and second side members are positioned above the roller beam and the screen beam;
- a hitch mechanism coupled to the frame;
- a roller coupled to the roller beam and configured to rotate about a longitudinal axis and retrieve thorny seeds from an area of ground through impaling the thorny seeds into the roller;
- a screen surrounding both the roller and the screen beam, the screen configured to remove the thorny seeds from the roller and deposit them into a collection bin.

8. The thorn extractor apparatus of claim 7, wherein the hitch is coupled to an automatic drive system.

9. The thorn extractor apparatus of claim 8, wherein the automatic drive system is autonomously controlled.

10. The thorn extractor apparatus of claim 7, wherein the hitch is coupled to a vehicle.

11. The thorn extractor apparatus of claim 7, wherein the roller comprises a hard, hollow drum couplable to a soft outer material.

12. The thorn extractor apparatus of claim 11, wherein the soft outer material comprises neoprene, foam, soft plastic, rubber, vinyl, or a synthetic polymer.

13. A thorn extractor apparatus, comprising:
- a tongue comprising a hitch mechanism;
- an upper frame coupled to the tongue;
- a lower frame comprising a plurality of side members;
- a plurality of hinges coupled to the upper frame and the lower frame;
- a plurality of rollers coupled to the lower frame and configured to rotate about a longitudinal axis and retrieve thorny seeds from an area of ground through impaling the thorny seeds into plurality of rollers; and
- a plurality of screens surrounding the plurality of rollers, respectively, each screen configured to remove the thorny seeds from each of the rollers, respectively, and deposit them into a plurality of collection bins.

14. The thorn extractor apparatus of claim 13, wherein the upper frame comprises a vertical adjustment member.

15. The thorn extractor apparatus of claim 13, wherein a tow vehicle is coupled to the hitch mechanism.

16. The thorn extractor apparatus of claim 15, wherein the tow vehicle is an automatic drive system, a riding lawnmower, a tractor, an all-terrain vehicle, a car, or a truck.

17. The thorn extractor apparatus of claim 13, wherein the upper frame comprises a vacuum.

18. The thorn extractor apparatus of claim 13, wherein the collection bin comprises a first rail and a second rail respectively couplable to a first channel and a second channel on the frame.

19. The thorn extractor apparatus of claim 13, wherein the upper frame comprises a tab.

20. The thorn extractor apparatus of claim 19, wherein a hitch mechanism of a second thorn extractor apparatus is coupled to the tab of the thorn extractor apparatus.

\* \* \* \* \*